United States Patent
Zhang et al.

(10) Patent No.: US 9,303,181 B2
(45) Date of Patent: Apr. 5, 2016

(54) PROCESS FOR MAKING CROSSLINKABLE POLYURETHANE/ACRYLIC HYBRID DISPERSIONS

(75) Inventors: Jiguang Zhang, Shanghai (CN); Shouxue Guo, Shanghai (CN); Yujiang Wang, Shanghai (CN); Shaoguang Feng, Shanghai (CN); Siyuan Jiang, Shanghai (CN); Caifeng Wang, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/363,327

(22) PCT Filed: Dec. 22, 2011

(86) PCT No.: PCT/CN2011/084416
§ 371 (c)(1),
(2), (4) Date: Jun. 6, 2014

(87) PCT Pub. No.: WO2013/091209
PCT Pub. Date: Jun. 27, 2013

(65) Prior Publication Data
US 2014/0323639 A1    Oct. 30, 2014

(51) Int. Cl.
| | | |
|---|---|---|
| C08L 33/12 | (2006.01) |
| C09D 133/14 | (2006.01) |
| C08F 283/00 | (2006.01) |
| C09D 133/12 | (2006.01) |
| C08G 18/48 | (2006.01) |
| C08G 18/66 | (2006.01) |
| C08F 290/06 | (2006.01) |
| C08G 18/08 | (2006.01) |
| C08G 18/10 | (2006.01) |
| C08G 18/12 | (2006.01) |
| C08G 18/32 | (2006.01) |
| C08G 18/38 | (2006.01) |
| C08G 18/42 | (2006.01) |

(52) U.S. Cl.
CPC .......... *C09D 133/14* (2013.01); *C08F 283/006* (2013.01); *C08F 290/067* (2013.01); *C08G 18/0823* (2013.01); *C08G 18/10* (2013.01); *C08G 18/12* (2013.01); *C08G 18/3206* (2013.01); *C08G 18/384* (2013.01); *C08G 18/4238* (2013.01); *C08G 18/4825* (2013.01); *C08G 18/6674* (2013.01); *C08G 18/6692* (2013.01); *C08L 33/12* (2013.01); *C09D 133/12* (2013.01)

(58) Field of Classification Search
CPC .... C08F 283/006; C08L 33/12; C09D 133/12
USPC .......................................... 524/507; 525/454
See application file for complete search history.

(56) References Cited

U.S. PATENT DOCUMENTS

| | | | |
|---|---|---|---|
| 6,239,209 B1 * | 5/2001 | Yang et al. ..................... | 524/507 |
| 6,602,972 B1 | 8/2003 | Schwarte et al. | |
| 2004/0003414 A1 | 1/2004 | Van Noetsele | |
| 2004/0034146 A1 * | 2/2004 | Gertzmann et al. .......... | 524/457 |
| 2004/0167252 A1 * | 8/2004 | Melchiors et al. ............. | 524/13 |
| 2004/0254292 A1 * | 12/2004 | Williams ....................... | 524/589 |
| 2006/0018975 A1 | 1/2006 | Talbott | |
| 2007/0265388 A1 * | 11/2007 | Argyropoulos et al. ...... | 524/590 |
| 2009/0111934 A1 | 4/2009 | Yuan et al. | |
| 2011/0245415 A1 * | 10/2011 | Swarup ......................... | 524/839 |
| 2014/0323638 A1 * | 10/2014 | Zhang et al. .................. | 524/507 |
| 2014/0323639 A1 * | 10/2014 | Zhang et al. .................. | 524/507 |

FOREIGN PATENT DOCUMENTS

| | | |
|---|---|---|
| CN | 1880374 A | 12/2006 |
| CN | 101792570 A | 8/2010 |
| EP | 1391471 A1 | 2/2004 |
| JP | 10237138 A | 9/1998 |
| WO | 2004096882 A1 | 11/2004 |
| WO | 2004096883 A1 | 11/2004 |
| WO | 2011123492 A2 | 10/2011 |

OTHER PUBLICATIONS

Rao, Ximei; Xie, Wei; Li, Li; Xu, Gewen; Polyurethane Industry (2006), 21 (6), 22-25.
Chen, Su; Chen, Li; Colloid Polym Sci (2003) 282, 14-20.

* cited by examiner

*Primary Examiner* — Michael A Salvitti
(74) *Attorney, Agent, or Firm* — Karl E. Stauss

(57) ABSTRACT

The present invention provides a new process of preparation for PUA with superior mechanical performance, such as elongation, and tensile strength. The process is solvent free, smooth, and robust. PU prepolymer prepared according to the present invention has low viscosity, and contains no particulate DMPA.

9 Claims, No Drawings

PROCESS FOR MAKING CROSSLINKABLE POLYURETHANE/ACRYLIC HYBRID DISPERSIONS

FIELD

The invention relates to a new process for making crosslinkable Polyurethane/Acrylic (PUA) hybrid dispersions, specifically, it relates to a chemical hybrid method for preparing stable crosslinkable PUA hybrid dispersions and the crosslinkable PUA hybrid dispersions produced by this process.

BACKGROUND

Over recent decades, there has been a concerted effort to reduce atmospheric pollution caused by volatile solvents which are emitted during painting processes. Due to environmental concerns, volatile organic compounds (VOCs) have come under strict regulation by the government. Therefore, one of the major goals of the coating industry is to minimize the use of organic solvents by formulating waterborne coating compositions which provide a smooth, high gloss appearance, as well as good physical properties including resistance to acid rain. While the solvent-type coatings provide many benefits, such as that they are fast-drying, have a high hardness, a high abrasion-resistance, a high water-resistance, a high chemical-resistance and a low price, the waterborne coatings have environment-friendly benefits in that they are not flammable or explosive. The waterborne coatings use water as the system solvent and contain no poisonous chemicals. They require no or low amounts of volatile organic compounds.

The unique advantage of polyurethane dispersions (PUDs) in relation to surface coatings is their ability to form coherent film and to control the microphase morphology by controlling the relative amounts of soft and hard segments in polymer chain. These features allow PUDs to be employed in a wide variety of surface coating applications where mechanical properties are particularly crucial. High abrasion resistance, superior toughness, elastomeric properties, and high extensibility at low temperature are typical benefits. However, relatively high raw material cost in comparison with a typical acrylic emulsion has restricted its use in many industrial applications. To overcome this, polyurethane dispersions have been combined with other relatively inexpensive polymers to obtain a cost/performance balance because the properties of polyurethane (PU) and the polyacrylate (PA) complement each other. The composite materials of PU and PA are more outstanding in terms of adhesion, film-formability, non-stickiness, weather-resistance, elongation and strength of the film with excellent cost-performance balance. Accordingly, since the development of PU, the modification of the PU by the PA has been an active research topic in the art.

Two methods can be used to modify PU with PA: physical methods and chemical methods. The physical method is achieved by mechanical mixing. In the physical method, aqueous PA and PU dispersions (emulsions) are independently prepared first, and then both dispersions are mixed together under mechanical power. It is a very convenient method that makes it easy to control the composition of the final product. However, in such blends the superior performance properties may be compromised because of the incompatibility of the two. Such blended dispersion may suffer from instability.

For these reasons, the chemical modification technology currently plays a more important role. The chemical method is achieved by post-polymerization of acrylates. In the chemical method, the PU dispersion can be prepared first, and then acrylates and other vinyl monomers can be polymerized in the PU dispersion. In most cases, core-shell emulsion polymerization is adopted. PU particles are used as seed particles and the acrylates are polymerized within the PU particles due to high hydrophobicity of the acrylates. These hybrid dispersions are expected to provide the advantages of PA, such as excellent weather resistance, affinity to pigments as well as lower cost, and the advantages of PU, such as better mechanical stability, excellent adhesion, solvent and chemical resistance, and toughness.

U.S. Patent Application No.: 2009/0111934 A1 to Caideng Yuan discloses methods for the preparation of an aqueous PA modified PU dispersion, which includes three main steps: a) preparation of PA polymer or copolymer dispersion; b) preparation of PU prepolymer with carboxylic groups and neutralization treatment to the carboxylic groups; and c) dispersion and chain-extension of PU prepolymer by adding the PA dispersion into the PU prepolymer under vigorous agitation, or other mechanical operation. The result hybrid dispersion can be self-crosslinked by reaction between acetoacetoxy compound on PA particle and amine group on PU dispersion particles. A solvent, N-methyl-2-pyrrolidinone (NMP, b.p. 202~204° C.) was used as during the PU dispersion synthesis process. The use of NMP raises environmental concerns.

U.S. Publication No. 2004/0034146 discloses a complicated solvent free process for preparing hybrid PUA. The PU prepolymer was NCO free and there is no chain extension step in water. The viscosity of the PU prepolymer could be too high to be well dispersed into water. Additionally, dimethylol propane acid (DMPA) was used as an acid containing diol which provides water-dispersity of the PUA dispersion. However, DMPA is hard to dissolve completely, so that the final prepolymer may still contain particulate DMPA and the reaction was not complete.

The present inventors have solved the problem of inhomogeniety of the reaction system and have provided processes for preparing PUAs with superior mechanical performance, such as elongation, and tensile strength. The process is solvent free, smooth, and robust. PU prepolymer prepared according to the present invention has low viscosity, and contains no particulate DMPA.

SUMMARY

The present invention provides processes for making polyurethane/acrylic hybrid dispersions comprising: i) adding at least one polyol to a reactor; ii) adding DMPA simultaneously with/after step i), but before step iii), as water dispersibility enhancing agent at a temperature of from 115° C. to 140° C. to obtain a homogeneous solution; iii) adding at least one polyisocyanate at a temperature of from 75° C. to 95° C. until the NCO content reaches a constant value to prepare the polyurethane prepolymer; iv) adding at least one acrylate monomer(s), at least one styrenic monomer(s), or the mixture thereof, as diluent to the polyurethane prepolymer, at a temperature of from 40° C. to 65° C.; v) adding neutralizing agent; vi) dispersing and extending the polyurethane prepolymer in the presence of the acrylate monomer, and/or the styrenic monomer of step iv); and vii) adding at least one ethylenically unsaturated nonionic monomer(s), and co-polymerizing the same with the acrylate monomer, and/or the styrenic monomer of step iv), to get the polyurethane/acrylate hybrid dispersion. The process is continuous.

The present invention further provides processes for making polyurethane/acrylic hybrid dispersions comprising cold-blending the polyurethane/acrylic hybrid dispersions of the present invention with polyacrylate dispersion under agitation. Optionally, the polyurethane/acrylic hybrid dispersion and polyacrylate dispersion are both modified by copolymerization with diacetone acrylamide (DAAm) or acetoacetoxyethyl methacrylate (AAEM).

Further, adipic acid dihydrazide, as crosslinker, may be added into the blend.

The present invention further provides the polyurethane/acrylic hybrid dispersions prepared thereof.

The present invention further provides a coating composition comprising the polyurethane/acrylic hybrid dispersion prepared thereof.

DETAILED DESCRIPTION

In the present invention, the term "polyurethane" or "PU" describes polymers including oligomers (e.g., prepolymers) which contain multiple urethane groups, i.e., —O—C(=O)—NH—, regardless of how they are made. As is well known, polyurethanes can contain additional groups such as urea, allophanate, biuret, carbodiimide, oxazolidinyl, isocyanurate, uretdione, ether, ester, carbonate, etc., in addition to urethane groups. Typically, the prepolymers will be above 1,000 or 2,000 Daltons in number average molecular weight and if the chain is extended during processing, can reach number average molecular weights in the millions of Daltons.

The term "polyacrylate" or "PA" as used herein means those polymers or resins resulting from the polymerization of one or more acrylates such as, for example, methyl acrylate, ethyl acrylate, butyl acrylate, 2-ethylhexyl acrylate, etc. as well as the methacrylates such as, for instance, methyl methacrylate, ethyl methacrylate, butyl methacrylate, hexyl methacrylate, etc. Copolymers of the above acrylate and methacrylate monomers are also included within the term "polyacrylate" as it appears herein. The polymerization of the monomeric acrylates and methacrylates to provide the PA dispersions useful in the practice of the invention may be accomplished by any of the well known polymerization techniques.

PUA in this invention is prepared by a) PU prepolymer preparation; b) dispersing and extending PU prepolymer in water; and c) adding and polymerizing at least one ethylenically unsaturated nonionic monomer(s).

In a), PU prepolymer preparation of the present invention is conducted under decreasing temperature. Polyol(s) is added into the reaction vessel (the system) under $N_2$ purging and the system is heated to a high temperature, preferably from 115° C. to 140° C., more preferably from 120° C. to 130° C. DMPA, as a water-dispersibility enhancing agent is simultaneously or later added into the system under mild stiffing until a homogeneous solution is obtained. System temperature is lowered to 75° C.-95° C., more preferably from 80° C. to 85° C. Polyisocyanate(s) is then added into the system, and the reaction proceeds until the NCO content reaches a constant value. After that, temperature is lowered further to from 40° C. to 65° C., more preferably from 55° C. to 60° C., and at least one acrylate monomer(s), at least one styrenic monomer(s), or the mixture thereof is added as reactive diluent or so called solvent. The weight ratio of acrylate and/or styrenic monomers in the total weight of prepolymer could range from 10 wt. % to 50 wt. %, preferably from 10 wt. % to 30 wt. %. Following that, triethyl amine (TEA) as neutralizing agent is added. The molar ratio of TEA to DMPA ranges from 0.9:1 to 1.1:1, preferably from 0.9:1 to 1:1.

In b), after a short (several minutes, such as, from 5 to 15 minutes, etc.) mixing time, the prepolymer is gradually poured into DI water under agitation to form a dispersion. Several minutes later, chain extender with a molar ratio to NCO as 0.9:1 to 1.1:1, preferably from 0.9:1 to 1:1 is added dropwise to above dispersion.

Then, ethylenically unsaturated nonionic monomer(s) is added into the system as polymerization unit. The total amount of ethylenically unsaturated nonionic monomer(s) is from 10 wt. % to 80 wt. %, preferably from 30 wt. % to 50 wt. % basing on the total weight of the PUA polymer.

The dispersing b) can alternatively be conducted by pouring the PU prepolymer into a PA dispersion under agitation followed by chain extension.

In c), at least one ethylenically unsaturated nonionic monomer(s) is added and then polymerized via radical polymerization in the presence of initiator and at elevated temperature.

Optionally, the PUA dispersion prepared according to the above process can be mixed with PA dispersion under agitation.

Optionally, the PUA dispersion and PA dispersion are separately modified by copolymerization with diacetone-based monomer, preferably, with DAAm or AAEM and other acrylate monomer(s). The amount of DAAm or AAEM is around 1 to 3 wt %, based on the total weight of monomers used to make the acrylic/styrenic portion of PUA.

Adipic acid dihydrazide (ADH), as crosslinker, may be added into to the blend of PUA and PA dispersions. The content of polyacrylate, including those in both PA and PUA, may range from 10 wt. % to 80 wt. % in the total weight based on the total solids of PA and PUA.

Polyols, including polyether diols, polyester diols or multifunctional polyols, are used to prepare the PU prepolymer. "Polyols" means any product having two or more hydroxyl groups per molecule. Non-limiting examples of the polyols useful herein include polyether polyols, polyester polyols such as alkyds, polycarbonate polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols and hydrogenated polybutadiene polyols, polyisobutylene polyols, polyacrylate polyols, polyols derived from halogenated polyesters and polyethers, and the like, and mixtures thereof. The polyether polyols, polyester polyols, and polycarbonate polyols are preferred.

The polyether polyols that can be used as the active hydrogen-containing compound according to the present invention contain the —C—O—C— group. They can be obtained in a known manner by the reaction of starting compounds that contain reactive hydrogen atoms such as water or diols, and alkylene oxides such as ethylene oxide, propylene oxide, butylene oxide, styrene oxide, tetrahydrofuran, epichlorohydrin and mixtures thereof. Preferred polyethers include poly(propylene glycol) with molecular weight of 400 to 3000, polytetrahydrofuran and copolymers of poly(ethylene glycol) and poly(propylene glycol). The diols used in the preparation of the polyether polyols include alkylene glycols, preferably ethylene glycol, diethylene glycol and butylene glycol.

The polyester polyols are typically esterification products prepared by the reaction of organic polycarboxylic acids or their anhydrides with a stoichiometric excess of a diol or diols. Non-limiting examples of suitable polyols for use in the reaction include poly(glycol adipate), poly(ethylene terephthalate) polyols, polycaprolactone polyols, alkyd polyols, orthophthalic polyols, sulfonated and phosphonated polyols, and mixtures thereof. The diols used in making the polyester polyols are as set forth for preparing the polyether polyols. Suitable carboxylic acids used in making the polyester polyols include, but are not limited to, dicarboxylic acids, tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic and/or aromatic dibasic acids.

Particularly interesting polyols are the polyester diols containing —C(=O)—O-group. Non-limiting examples include poly(butanediol adipate), caprolactones, acid-containing polyols, polyesters made from hexane diol, adipic acid and isophthalic acid such as hexane adipate isophthalate polyester, hexane diol neopentyl glycol adipic acid polyester diols, as well as propylene glycol maleic anhydride adipic acid polyester diols, and hexane diol neopentyl glycol fumaric acid polyester diols.

Polyisocyanates have two or more isocyanate groups on average, preferably two to four isocyanate groups per molecule. Polyisocyanates typically comprise about 5 to 20 carbon atoms and include aliphatic, cycloaliphatic, aryl-aliphatic, and aromatic polyisocyanates, as well as products of their oligomerization, used alone or in mixtures of two or more. Diisocyanates are preferred. Toluene diisocyanate, hexamethylene isocyanate and/or isophorone isocyanate may preferably be used in the embodiment of the present invention.

Non-limiting examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Non-limiting examples of suitable cycloaliphatic polyisocyanates include dicyclohexylmethane diisocyanate (commercially available as Desmodur™ from Bayer Corporation), isophorone diisocyanate, 1,4-cyclohexane diisocyanate, 1,3-bis-(isocyanatomethyl)cyclohexane, and the like. Preferred cycloaliphatic polyisocyanates include dicyclohexylmethane diisocyanate and isophorone diisocyanate.

Non-limiting examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Non-limiting examples of suitable aromatic polyisocyanates include 4,4'-diphenylmethylene diisocyanate, toluene diisocyanate, their isomers, naphthalene diisocyanate, their oligomeric forms and the like. A preferred aromatic polyisocyanate is toluene diisocyanate.

The PU prepolymer may be formed without using a catalyst if desired, but using a catalyst may be preferred in some embodiments of the present invention. Non-limiting examples of suitable catalysts include stannous octoate, dibutyl tin dilaurate, and tertiary amine compounds such as triethylamine and bis-(dimethylaminoethyl)ether, morpholine compounds, bismuth carboxylate, zinc bismuth carboxylate and diazabicyclo[2.2.2]octane. Organic tin catalysts are preferred.

In the present invention, organic solvents are preferably not used, so the solvent-removing stage is omitted. Chain extenders used in the preparation of the PU dispersion are employed in the dispersion step b). Non-limiting examples of chain extenders useful in this regard include any of inorganic or organic polyamines having an average of about 2 or more primary and/or secondary amine groups, amine functional polyols, ureas, or combinations thereof, and their mixtures. Suitable organic amines for use as a chain extender include, but are not limited to, diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for the present invention are propylene diamine, butylene diamine, hexamethylene diamine, cyclohexylene diamine, phenylene diamine, tolylene diamine, 3,3-dichlorobenzidene, 4,4'-methylene-bis-(2-chloro aniline), 3,3-dichloro-4,4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable ureas include urea and its derivatives, and the like, and mixtures thereof. Ethylene diamine is preferably used. The amount of chain extender, which can be added before or after dispersion, typically ranges from about 0.5 to about 1.1 equivalents based on available equivalents of isocyanate.

The PA dispersion of the present invention may comprise a homopolymer of acrylates, a copolymer of acrylates, a copolymer of acrylates with other vinyl monomers, and/or mixtures thereof. With the consideration of properties and prices of the products, all traditional co-monomers may be used to prepare the polymers and copolymers.

Non-limiting examples of suitable acrylate monomer(s) include esters of (meth)acrylic acid containing 1 to 18 carbon atoms in the alcohol radical, such as methyl methacrylate, butyl methacrylate, ethyl acrylate, butyl acrylate, cyclohexyl acrylate, 2-ethylhexyl acrylate and stearyl acrylate; di(meth)acrylic acid esters of diols, e.g. ethylene glycol, 1,4-butanediol or 1,6-hexanediol. The monomers including methyl (meth)acrylate, ethyl acrylate, butyl acrylate, hexyl acrylate, 2-ethylhexyl acrylate, hydroxyethyl(meth)acrylate, hydroxypropyl(meth)acrylate and glycidyl methacrylate, are preferable.

The ethylenically unsaturated nonionic monomers include, for example, (meth)acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride, vinylidene chloride.

Herein, "nonionic monomer" means that the copolymerized monomer residue does not bear an ionic charge between pH=1-14.

For the polymerization of monomers, initiators may be used. Examples of suitable initiators include, but are not limited to, peroxides such as potassium peroxy-disulphate, ammonium peroxydisulphate, organic peroxides, organic hydroperoxides and hydrogen peroxide. Redox systems are preferably used, such as water-soluble, radical-producing non-ionogenic peroxides, e.g. t-butyl hydroperoxide, as the oxidation component, and reduction components such as formaldehyde sulphoxylate or ascorbic acid. Ammonium peroxydisulphate, also called ammonium persulfate, is preferably used.

The polymerization can be carried out using any technical method for preparing an aqueous emulsion polymerization, employing non-ionic and/or anionic surfactants. Commercial emulsion products may also be used as needed. The designs for the formulations and the reaction technology can be utilized to obtain specific particle morphologies and reactive functionalities so that the PA can match the PU prepolymer/dispersion and/or PUA dispersion to give good film properties. Preferably, the polymerization is carried out with the previously mentioned monomers and is initiated with radical initiators. In one embodiment of the present invention, the mixture of monomers pre-emulsion and the initiator solution are respectively fed into a reactor over a defined period of time, such as 0.8 to 6 hours, preferably 3.5 hours. The initiator solution may comprise an initiator and water. The pre-emulsion comprises monomer mixture, surfactant/emulsifier and water. The polymerization time span is dependent on the reaction conditions, such as temperature, initiator type and dosage, monomer dosage (solid content) and the reactivity of the monomers.

Emulsion polymerization is generally conducted at temperatures of about 55° C. to about 90° C., preferably 60° C. to 85° C., and more preferably 75° C. to 80° C. After the completion of the polymerization reaction, the polymer emulsion is allowed to cool down to ambient temperature.

The obtained aqueous polymer emulsion has an average particle diameter of 30 to 300 nm, preferably 40 to 90 nm, more preferably 50 to 80 nm The PUA dispersion made according to the present invention can be used for preparing coating compositions.

Additional ingredients of the coating composition include, but are not limited to, stabilizers, colorants, pigments, dispersants, surfactants, paraffins, waxes, UV light stabilizers, rheology modifiers, mildewcides, biocides, fungicides, and other conventional additives. Colorants and pigment dispersions, when used, are typically added in amounts up to about 15% by volume of the total composition.

In the present specification, the technical features in each preferred technical solution and more preferred technical solution can be combined with each other to form new technical solutions unless indicated otherwise. For briefness, the applicant omits descriptions of these combinations. However, all the technical solutions obtained by combining these technical features should be deemed as being literally described in the present specification in an explicit manner.

EXAMPLES

I. Raw Materials

Materials used for preparing the PUA hybrid dispersion

| Function | Chemical nature | Abbreviation |
|---|---|---|
| Polyol | Polypropylane glycol (Mw = 1000) | PPG1k |
| | Polypropylane glycol (Mw = 2000) | PPG2k |
| | Poly(butanediol adipate) (Mw = 2000) | PBA2k |
| | Polycarprolactone (Mw = 2000) | PCL2k |
| | Polyethylene glycol (Mw = 400) | PEG400 |
| | Polytetrahydrofuran (Mw = 2000) | PTMEG2k |
| Isocyanate | Isophorone diisocyanate | IPDI |
| | bis(isocyanatomethyl)cyclohexane | ADI |
| Catalyst for PU prepolymer | Dibutyltin dilaurate | DBTDL |
| Dispersing improving agent | Dimethyolpropionic acid | DMPA |
| Chain extender | 1,4-butanediol | BDO |
| | 1,2-propanediamine | PDA |
| Neutralizing agent | Triethylamine | TEA |
| | Ammonia | NH3•H2O |

-continued

Materials used for preparing the PUA hybrid dispersion

| Function | Chemical nature | Abbreviation |
|---|---|---|
| Surfactant | Sodium dodecylsulphate | SDS |
| Monomer | Methyl methacrylate | MMA |
| | Butyl acrylate | BA |
| | Acrylic acid | AA |
| | Hydroxyl ethyl methacrylate | HEMA |
| | 2-ethylhexyl acrylate | 2-EHA |
| | Styrene | St |
| Other functional monomer | Diacetone acrylamide | DAAm |
| | Acetoacetoxyethyl methacrylate | AAEM |
| Crosslinker | Adipic acid dihydrazide | ADH |
| Initiator | Ammonium persulfate | APS |
| pH buffer | Sodium bicarbonate | NaHCO3 |

II. Synthesis Processes

Synthesis Of PUA1

(1) Putting 70 g PPG1 k, 30 g PPG2 k 10 g PEG400, 0.12 g DBTDL catalyst into a three-necked flask, stirring and heating the flask to 115° C. under $N_2$ purging and 10 g DMPA was then added to the flask until the system became homogenuous and clear;

(2) Adding 50 g IPDI into the flask when the temperature of the reactant reaches to 75° C.;

(3) Keeping the reaction for 120 min at 75° C.;

(4) Adding HEMA into the flask and continuing the reaction for 0.5 h at 75° C.; cooling the temperature to 65° C.;

(5) Adding 100 g MMA and 20 g BA into the flask, stirring for 5 min to obtain a clear solution;

(6) Dissolving 1 g DAAm and ammonia in water and putting the solution into the flask that contains PU prepolymer, and stiffing for about 30 minutes at 80° C.;

(7) Adding 20 g BA into the flask;

(8) Adding 0.4 g ammonium persulfate (APS) into the flask separately, and stirring the reactant for 1 h at 80° C.;

(8) Filtering the dispersion with 100-mesh filter cloth and taking the product as PUA1 dispersion.

Synthesis of PUA2

Under otherwise identical reaction conditions to PUA1, the procedure involve: 100 g PPG1 k, 100 g ADI, 30 g MMA and 10 g BA.

Synthesis of PUA3

(1) Putting 182.5 g PPG2 k, 156 g PBA2 k, 0.5 g DBTDL catalyst into a three-necked flask, stiffing and heating the flask to 120° C. under $N_2$ purging and adding 24.5 g DMPA into the flask until the system became homogenuous and clear;

(2) Adding 119 g IPDI into the flask when the temperature of the reactant reaches 80° C.;

(3) Keeping the reaction for 150 min at 80° C.;

(4) Lowering the temperature to 55° C. and adding 36 mL MMA into the flask, continue to stir for 0.5 h;

(5) Adding 16 g TEA at 55° C. and stirring for 10 min;

(6) Pouring the above prepolymers into 1200 mL de-ionized water under vigorous stirring;

(7) Adding 12 g propane diamine into the dispersion as chain extender;

(8) Taking 200 mL the dispersion into a 500 mL flask. Adding DI water, sodium hydrogen carbonate, MMA monomers as well as ammonium persulfate into the flask separately, and stiffing the reactant for 2 h at 75° C.;

(9) Filtrating the dispersion with 100-mesh filter cloth and taking the product as PUA3 dispersion.

Synthesis of PUA4

Making PUA4 under otherwise identical conditions as PUA3, except the initial temperature for dissolving DMPA was 130° C. and the reaction temperature was 95° C. The final temperature of prepolymer prior to dispersing was 40° C. The polyols include 169 g PPG2K and 169 g PBA2K.

Synthesis of PUA5

Making PUA5 under otherwise identical conditions as PUA3, except the initial temperature for dissolving DMPA was 130° C. and the reaction temperature was 95° C. The final temperature of prepolymer prior to dispersing was 40° C. The polyols include 154 g PPG2K and 184 g PBA2K.

Synthesis of PUA6

The synthesis procedure was similar to that for PUA4 except for the polyol type and reaction temperatures. The detailed conditions were: Using 338 g PCL2K as polyol. The initial temperature for dissolving DMPA was set at 125° C. The reaction temperature was 90° C. Before dispersing, the temperature was cooled to 60° C.

Synthesis of PUA7

Making PUA7 under otherwise identical conditions as PUA6, except the monomer diluent was 40 g styrene and adding 0.4 g DAAm during emulsion polymerization, Synthesis of PUA8

Making PUA8 under otherwise identical conditions as PUA6, except the monomer diluent was 40 g MMA and adding 0.4 g DAAm during emulsion polymerization, Synthesis of PUA9

Making PUA9 under otherwise identical condition to PUA3 except that the initial temperature for dissolving DMPA was 85° C. instead of 120° C. for PUA3 and MMA was added together with polyol at the beginning of the reaction.

Synthesis of PA1

(1) Charging the four necked flask with 24 g de-ionized water, 0.05 g APS and 0.26 g SDS surfactant; purging the reactor with $N_2$ for 20 min and then heating to 70° C. to initiate the reaction;
(2) Feeding pre-emulsion containing 71 g of de-ionized water, 0.25 g of $NaHCO_3$, 2.5 g of SDS surfactant, 0.4 g of APS initiator and monomer mixture containing 74 g BA, 25 g MMA and 1 g AA.
(3) Adding pre-emulsion over 120-150 min while maintaining the 70° C. reaction temperature. Adding 2.5 g DAAm when the remaining pre-emulsion reached the volume of 25 mL;
(4) Cooling to 45° C. and adding 2.3 g ammonia over 15-20 min Synthesis of PA2

Dow commercial product E3808, copolymer of MMA, and BA, with Tg of −25° C.

Synthesis of PA3

Dow commercial product E2468, copolymer of MMA, and BA, with Tg of −15° C.

Synthesis of PA4

Dow commercial product E3188, copolymer of MMA, and BA, with Tg of +50° C.

Synthesis of PA5

Dow commercial product BZ05-157, copolymer of MMA/ST/BA/EHA/MAA, with Tg of +50° C.

Synthesis of PA6

Dow commercial product HS01-24, same composition to BZ05-157 except one percent of DAAm was copolymerized, with Tg of +50° C.

Synthesis of PA7

Dow commercial product SF-230, copolymer of MMA/BA/MAA and one percent of AAEM, with Tg of +5° C.

III. Examples

The blend samples were prepared by blending PUA and PA emulsions following the recipe in Table 1. Blending is under stiffing only with solids of PUA and PA being 40% and 50%, respectively. The volumn of each emulsion is 15 mL. ADH crosslinker was added as solid.

Cold-blended PUD and PA, as Comparative Example 1, was also listed in the Table, it was prepared by blending, simply under stiffing, a commercial PUD product, Bayer PR-240 of solid of 40 wt %, with PA2 in 1:1 volume ratio.

TABLE 1

| Examples | PUA | PA | ADH/g |
|---|---|---|---|
| 1 | PUA1 | | |
| 2 | PUA2 | | |
| 3 | PUA3 | | |
| 4 | PUA4 | | |
| 5 | PUA5 | | |
| 6 | PUA6 | | |
| 7 | PUA7 | | |
| 8 | PUA8 | | |
| Comp. 1 | PUD | PA2 | |
| Comp. 2 | PUA9 | | |
| Comp. 3 | PA1 | | |
| Comp. 4 | PA2 | | |
| Comp. 5 | PA3 | | |
| Comp. 6 | PA4 | | |
| Comp. 7 | PA5 | | |
| Comp. 8 | PA6 | | |
| Comp. 9 | PA7 | | |
| 1b | PUA1 | PA1 | 0 |
| 2b | PUA1 | PA1 | 0.02 |
| 3b | PUA1 | PA1 | 0.04 |
| 4b | PUA1 | PA1 | 0.06 |
| 5b | PUA2 | PA2 | 0 |
| 6b | PUA3 | PA3 | 0 |
| 7b | PUA3 | PA4 | 0 |
| 8b | PUA7 | PA7 | 0 |
| 9b | PUA8 | PA5 | 0 |
| 10b | PUA8 | PA5 | 0.05 |
| 11b | PUA8 | PA6 | 0 |

IV. Performance Test

1. Temperature Effects

Comparative Example 2 vs Example 3

DMPA particulate was seen collected on the wall of the flask and the solution of prepolymer at the end of synthesis is turbid or milky in Comparative Example 2. In contrast, in PUA3 the solution was clear and no particulate DMPA was seen in the flask.

2. Latex Film Preparation

The films were prepared by casting certain amount of dispersion into a petri dish and let dry for two weeks at room temperature. Generally, after one week of drying, the film was peeled off the petri dish to dry the other side for one week.

3. Mechanical Properties

The mechanical properties i.e., the tensile strength and elongation of the latex films were measured using a Gotech-AI 7000 M Universal Testing Machine with a crosshead speed of 200 mm/min. The experiments were conducted at room temperature. Rectangle specimens of 80 mm×10 mm (length×width) free standing film with around 1 mm thickness were used. An average value of at least three replicates of each sample was taken.

4. The Mechanical Properties of Films in Example 1 Through 8, i.e. PUA1 Through PUA8 were Summarized in Table 2. Comparative Examples 3 to 9 were Listed in Table 3.

TABLE 2

| Examples | Tensile strength (MPa | Elongation (%) |
|---|---|---|
| 1 | 3.2 | 520 |
| 2 | 9.4 | 303 |
| 3 | 44 | 680 |
| 4 | 22 | 1024 |
| 5 | 27 | 912 |
| 6 | 22 | 1050 |

TABLE 2-continued

| Examples | Tensile strength (MPa) | Elongation (%) |
|---|---|---|
| 7 | 32 | 700 |
| 8 | 25 | 700 |

TABLE 3

| Examples | Tensile strength (MPa) | Elongation (%) |
|---|---|---|
| Comp. 1 | — | — |
| Comp. 2 | — | — |
| Comp. 3 | 0.9 | 2000 |
| Comp. 4 | 0.6 | 1800 |
| Comp. 5 | 1.5 | 1100 |
| Comp. 6 | — | — |
| Comp. 7 | — | — |
| Comp. 8 | — | — |
| Comp. 9 | 1.55 | 663 |

By comparing Table 2 and Table 3, PUA films of Example 1 to Example 8 showed significantly higher tensile strength than PA films of Comp. 1 to Comp. 9. The tensile strength for PUA ranged from 3.2 MPa to 44 MPs. For the contrast, the strongest PA film had only 1.55 MPa tensile strength. The clear film formed from PUA samples showed high tensile strength and high elongation. Such performance well exceeded the performance of typical EWC emulsion (about 1.0 MPa in tensile strength). For PA in Comparative Examples 6, 7 and 8, the PA films cannot form film by themselves at room temperature without using organic solvent as film forming agent. The use of film forming agent can give rise to environmental concerns.

TABLE 4

| Examples | Tensile strength (MPa) | Elongation (%) |
|---|---|---|
| 1b | 1.5 | 1500 |
| 2b | 3 | 500 |
| 3b | 4.3 | 560 |
| 4b | 6 | 332 |
| 5b | 6.96 | 390 |
| 6b | 7.7 | 700 |
| 7b | —* | —* |
| 8b | 10.6 | 421 |
| 9b | 12.6 | 233 |
| 10b | 15.4 | 315 |
| 11b | 17.1 | 313 |

*Not available

Those PA samples which could not form film at ambient temperature could instead form continuous film by blending with PUA emulsions. The mechanical performance of the blend samples were summarized in Table 4.

As shown in Table 4, Examples 1b through 4b, one can adjust the PUA mechanical properties of the latex films prepared from Example 1 with ADH cross-linking agent to reach a satisfactory mechanical performance. Moreover, the properties can be tailored in a broad range by simply adding various amount of ADH cross-linking agent. Example 9b and 10b also demonstrated the effect of crosslinking. With ADH, both tensile strength and elongation performance were enhanced. The original PA examples Comp. 6 to Comp. 9 cannot form film due to its high Tg. After blending with PUA, they can form film with superior tensile strength, as demonstrated in Examples 7b through 11b. The original PA2 dispersion has very high elongation value but low mechanical strength. After blending, the mechanical properties of the blend film of Example 5b showed better balance in both tensile strength and elongation than each individual component of Example 2 and Comp. 4.

Surprisingly, it was found that the clear film of Inventive Example 6b from Example 6 showed both high tensile strength and high elongation. The high modulus can be retained in their blend sample, being as high as 7.7 MPa. The elongation was as high as 700%. Such performance well exceeded the performance of typical EWC emulsion (about 1.0 MPa in tensile strength). In such blend sample, no crosslinking agent was used and the PU component accounts for only about 25 wt % of the total weight, indicating the low cost and high efficiency in improving the mechanical strength.

5. Storage Stability of Example 1b to 11b

Stability of five PUA/PA blend samples (Example 1b to 5b) and PUD/PA dispersions (cold blend, Comp. 1) was evaluated through heat-ageing at 50° C. for 10 days. In all cases, no aggregation was observed from PUA/PA dispersions after 10 days of ageing. As contrast, the PUD/PA dispersion (Comp. 1. did show some gelation and increase in viscosity. The higher stability of the PUA/PA system than PUD/PA system is thought to be derived from the better compatibility between PU phase and PA phase in the PUA/PA system.

6. Film Formation and Clarity Properties of Example 1b

PUA1/PA1 inventive hybrid dispersion (Exp. 1b) produced a film with superior clarity of 5 (5 is the best score and 1 is the worst score), while the clarity of PUD/PA blend (Comp. 1) was 2.

7. Film Formation of Example 7b to 11b, with High-Tg PA

Comp. 6 to Comp. 9 alone could not form continuous film at room temperature because of its high Tg. Example 7b to example 11b (the blend of high Tg PA and PUA) with the volume of 1:1 could form continuous films and the films are of good clarity, which showed that PUA are well compatible with high Tg PA in the present invention.

8. Coating Performance of Example 7b

The blend of PUA3/PA4 (Example 7b) was used as clear coat in wood coating. The performance was summarized in Table 5. It was found that the clear film showed good water resistance and 50% alcohol resistance. No plasticizer was used in the formulation, so the formulation was zero in VOC.

TABLE 5

Performance of the clear film formed with PUA3/PA4 (Exp. 7b) in 1/1 blend ratio*

| PU (wt %) | MFFT$^a$ | Pendulum hardness | | | Pencil hardness$^b$ | Water resistance$^c$ | 50% alcohol resistance$^c$ | 100% alcohol resistance$^c$ |
| | | 4 h | 26 h | 2 days(50° C.) + 1 day(RT) | | | | |
|---|---|---|---|---|---|---|---|---|
| 25% | <0° C. | 75 | 94 | 107 | B | 5 | 5 | 2 |

*No plasticizer;
$^a$Minimum Film Formation Temperature
$^b$Hardest to Softest: 4H, 3H, 2H, H, F, HB, B, 2B, 3B, 4B, 5B, 6B;
$^c$Best = 5; Worst = 1.

The invention claimed is:

1. A process for making polyurethane/acrylic hybrid dispersions comprising the following continuous steps:
   i) adding at least one polyol consisting of polyether polyols, polyester polyols, polycarbonate polyols, or mixtures thereof into a reactor;
   ii) adding dimethylolpropionic acid (DMPA) simultaneously with step i), or after step i) but before step iii), as water dispersibility enhancing agent at a temperature of from 115° C. to 140° C. to obtain a homogeneous solution;
   iii) adding at least one polyisocyanate at a temperature of from 75° C. to 95° C. until NCO content reaches a constant value to prepare a polyurethane prepolymer;
   iv) adding at least one acrylate monomer, at least one styrenic monomer, or a mixture thereof, as diluent to the polyurethane prepolymer, at a temperature of from 40° C. to 65° C.;
   v) adding a neutralizing agent;
   vi) dispersing the polyurethane prepolymer in the presence of the acrylate monomer, and/or the styrenic monomer of step iv); and
   vii) adding at least one ethylenically unsaturated nonionic monomer, and co-polymerizing it together with the acrylate monomer, and/or the styrenic monomer of step iv), to get the polyurethane/acrylic hybrid dispersion.

2. The process for making polyurethane/acrylic hybrid dispersions according to claim 1, further comprising cold-blending the polyurethane/acrylic hybrid dispersions with a polyacrylate dispersion under agitation.

3. The process for making polyurethane/acrylic hybrid dispersions according to claim 2 wherein modifying both polyurethane/acrylic hybrid dispersion and polyacrylate dispersion by copolymerization with diacetone acrylamide or acetoacetoxyethyl methacrylate; and adding adipic acid dihydrazide, as crosslinker, into the blend.

4. The process for making polyurethane/acrylic hybrid dispersions according to claim 1 wherein the acrylate monomer is selected from the group consisting of (meth)acrylate, ethyl acrylate, butyl acrylate, hexyl acrylate, 2-ethylhexyl acrylate, hydroxyethyl (meth)acrylate, hydroxypropyl (meth)acrylate, glycidyl methacrylate, and combinations thereof.

5. The process for making polyurethane/acrylic hybrid dispersions according to claim 1 wherein the at least one polyisocyanate is a diisocyanate.

6. The process for making polyurethane/acrylic hybrid dispersions according to claim 5 wherein the diisocyanate is selected from bis(isocyanatomethyl)cyclohexane, hexamethylene diisocyanate, isophorone diisocyanate, and combinations thereof.

7. The process for making polyurethane/acrylic hybrid dispersions according to claim 1 wherein organic solvents are not used.

8. The process for making polyurethane/acrylic hybrid dispersions according to claim 1 wherein step vi) further comprises adding a chain extender.

9. The process for making polyurethane/acrylic hybrid dispersions according to claim 1 wherein the at least one polyol comprises a combination of a polyether polyol and a polyester polyol.

* * * * *